Aug. 5, 1958  G. M. ROBERTSON ET AL  2,845,857
CHEESE MAKING AND APPARATUS THEREFOR
Filed Feb. 13, 1956 3 Sheets-Sheet 1
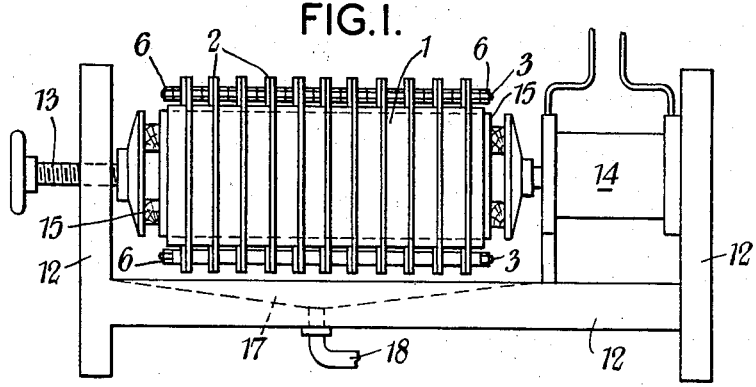
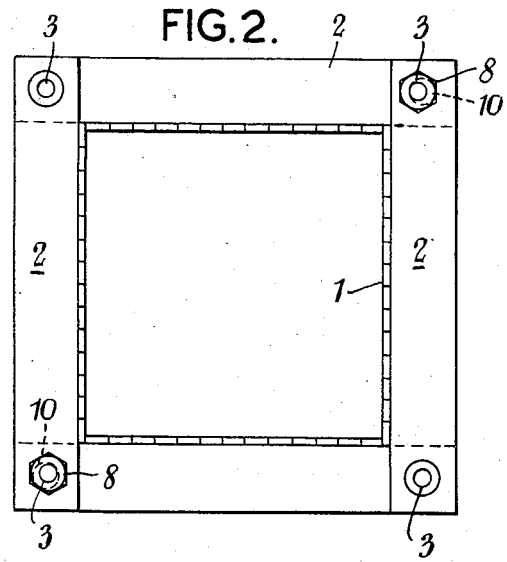
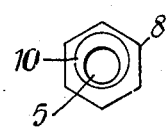
FIG.11.
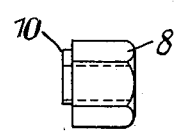
FIG.10.
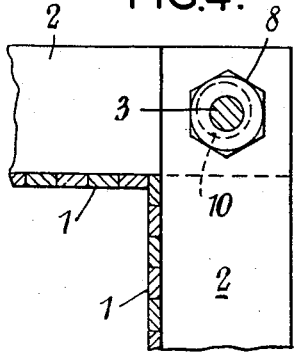
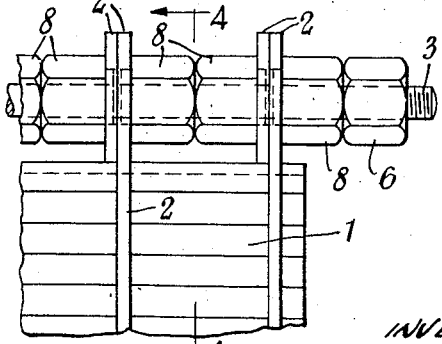
INVENTORS
GEORGE M. ROBERTSON
& GEORGE K. CHARLES
By Aug. 5, 1958   G. M. ROBERTSON ET AL   2,845,857
CHEESE MAKING AND APPARATUS THEREFOR
Filed Feb. 13, 1956   3 Sheets-Sheet 2
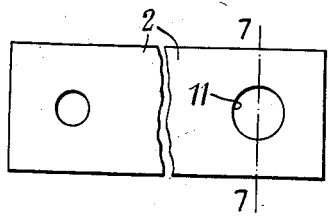
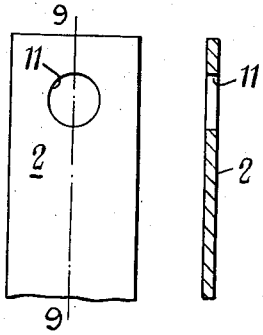
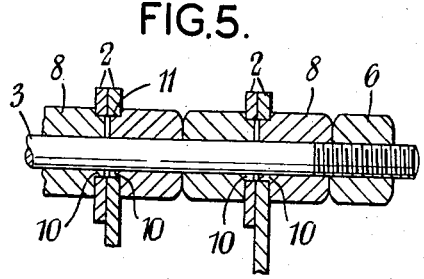
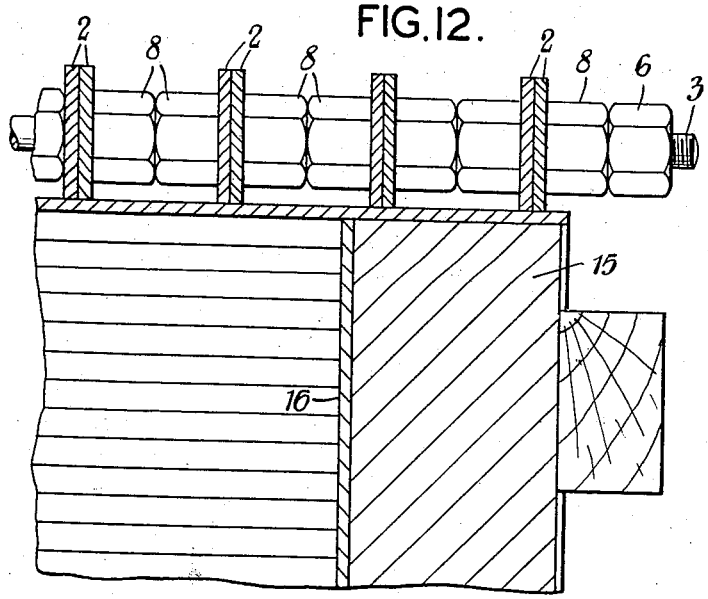
INVENTOR
GEORGE M. ROBERTSON
& GEORGE K. CHARLES Aug. 5, 1958   G. M. ROBERTSON ET AL   2,845,857
CHEESE MAKING AND APPARATUS THEREFOR
Filed Feb. 13, 1956   3 Sheets-Sheet 3
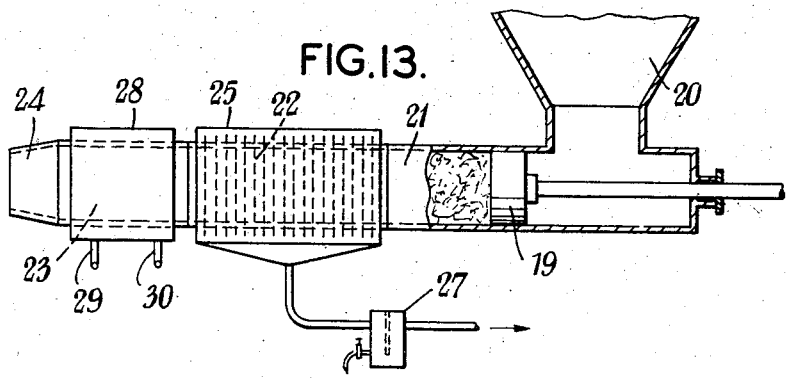
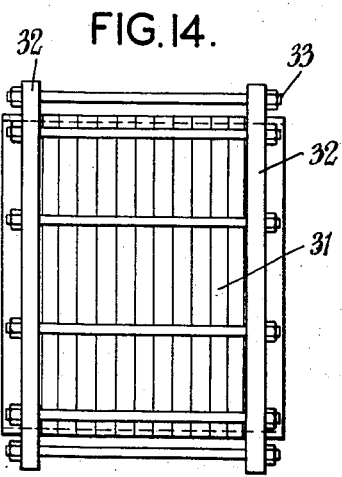
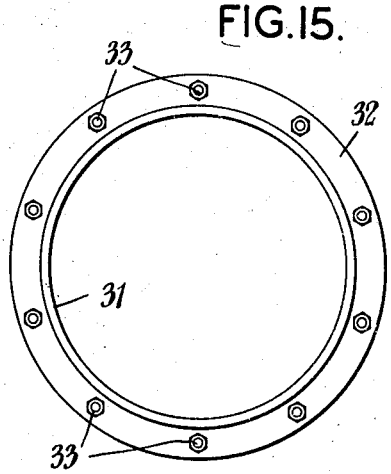
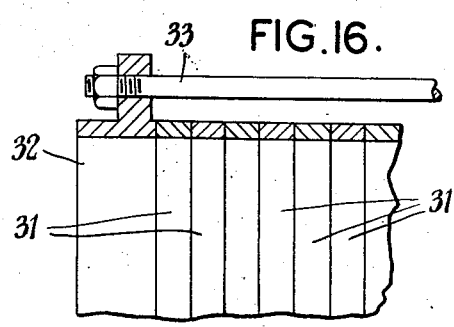
INVENTORS
GEORGE M. ROBERTSON
& GEORGE K. CHARLES
By

United States Patent Office 2,845,857
Patented Aug. 5, 1958

2,845,857

CHEESE MAKING AND APPARATUS THEREFOR

George M. Robertson and George K. Charles, Gildford, England

Application February 13, 1956, Serial No. 565,227

Claims priority, application Great Britain February 17, 1955

2 Claims. (Cl. 100—127)

The invention relates to apparatus used in pressing and moulding curd in the hard pressed types of cheese in the cheesemaking process and the method of removing surplus whey from the curd at this stage of manufacture. Hitherto the usual practice has been to use various types of cotton or linen fabrics as a medium for facilitating drainage of surplus whey. This invention eliminates the use of all such fabric.

The objects of the invention are as follows:

(1) To eliminate the use of materials such as cotton or linen in the pressing and moulding stage of cheesemaking.

(2) By eliminating the use of such materials, to render practicable the pressing of larger amounts of curd in one container.

(3) The invention makes it possible to make the moulding and pressing stage of cheesemaking a continuous process, whereby the curd enters the mould at one end and emerges at the other moulded to any shape required and pressed, excess whey having been eliminated during this stage.

(4) To assist the removal of whey and improve the surfaces or "coat" of the curd by applying a partial vacuum during the pressing stage.

(5) To apply varying degrees of heat to the surface of the curd through jacketed walls of the mould.

According to the invention curd ready for moulding and pressing is inserted in a mould composed of numerous closely fitting elements so that when the curd is compressed, the whey or moisture can be exuded through the capillary or very fine interstices between the elements which are too restricted for the extrusion of cheese.

The mould may be composed of numerous metal laths arranged edge to edge or other closely fitting relation and clamped, means being provided on the exterior of the mould to effect the clamping and also to reinforce or sustain the laths against internal pressure while permitting the whey or moisture to be exuded between the laths.

The mould may be encased in an outer casing or jacket adapted to receive steam or other heating medium. A jacket may be provided and it may be connected to a vacuum pump so as to set up a partial vacuum in the jacket to assist the exudation of the whey or moisture.

The mould may be adapted to receive curd in one position and deliver it at another, suitable means being provided to feed in the curd, set up the necessary pressure and control the delivery, thus facilitating the treatment of a batch, or a continuous supply of cheese.

In the accompanying drawings:

Figure 1 is a side view of an example of a mould according to the invention mounted in a press;

Figure 2 is an end view of the mould shown in Figure 1;

Figure 3 is a side view of part of the end of the mould;

Figure 4 is an end sectional view on 4—4 Figure 3;

Figure 5 is a sectional side view of the end clamping frame;

Figure 6 is a view of part of a bar of a clamping frame;

Figure 7 is a cross-section on 7—7 Figure 6;

Figure 8 is a view of part of another bar;

Figure 9 is a cross-section on 9—9 Figure 8;

Figures 10 and 11 are two views of an adjusting sleeve;

Figure 12 is a side sectional view of part of the mould shown in Figure 1 fitted with a thrusting block;

Figure 13 is a diagrammatic side view of a mould adapted for continuous operation;

Figures 14 and 15 are respectively a side view and plan of another example of mould according to the invention;

Figure 16 being a sectional view of part of this mould.

An example of mould according to the invention which is of square or rectangular shape in cross section is illustrated by Figures 1 to 12.

It comprises numerous laths 1 of stainless steel, aluminum or other suitable material, set edge to edge. Laths ½" wide and ⅛" thick are suitable. The contact edges of the laths are accurately prepared so as to permit of a close fit.

They are embraced by clamping frames each comprising flat metal bars 2 connected together by long bolts or rods 3. The ends of the rods 3 are screw threaded to receive nuts 6.

The holes in alternate ends of the bars need only be large enough to take the bolts 3 but those 11 in the other ends are larger.

Spacing sleeves 8 are provided on the rods 3 adjacent to the ends of the bars having the larger holes 11. Each sleeve has a hole 5 for the rod 3, and also has an eccentric 10 which fits in a corresponding hole 11 on the adjacent bar 2. Each sleeve 8 has a smooth bore for the rod 3 on which it is mounted and is shaped hexagonally so that it can be rotated on the rod or adjusted by a spanner. The holes 11 are eccentric to the holes 5 and the rods 3. By appropriately adjusting the sleeves 8 the frame bars 2 can be tightened onto the laths 1 so as to compress them firmly together at their contact edges. By these means the mould is provided with numerous very fine interstices or capillary passages which, when the mould is charged with curd and the curd is subjected to pressure, will prevent the extrusion of the curd but will permit of the exudation of excess whey or moisture.

In use the mould may be mounted in a known form of press for instance, as indicated in Figure 1, the press comprises a rigid framework structure 12 having a simple hand operated screw 13, or a compressed air cylinder 14 for applying the necessary pressure. A wooden thrusting block 15 is preferably inserted in each end of the mould. As shown in Figure 12 it may be faced with a rubber sheet 16 to prevent leakage around the block. The exuded whey is collected in a tray 17 and drained off through a pipe 18. When the excess whey has been sufficiently exuded from the curd the mould is removed from the press and the curd may be discharged by another press having a plunger thrusting against the block 15 at one end of the mould and discharging the block 15 and curd out through the other end.

The discharged curd being of square or rectangular cross section is in a very desirable shape as it facilitates cutting into slabs which can in turn be readily cut or pressed into small square or rectangular pieces facilitating package.

The use of cotton or other linen material hitherto considered necessary in the pressing or moulding stage of cheesemaking is rendered unnecessary by the use of the mould.

The passage of the curd through the mould imparts a smooth surface or "coat" to the curd.

In order to render the process or operation continuous the mould may be mounted adjacent to a charging device so that curd is fed in under pressure at one end and discharged from the other. For instance as diagrammatically indicated in Figure 13 a charging device comprising a reciprocatory plunger 19 may feed curd from a hopper 20 through a tubular duct 21 into one end of the mould 22 which is similar to that hereinbefore described. The curd is discharged through a tubular duct 23 which has a constricted discharge nozzle 24 offering resistance so that the plunger 19 can suitably compress the curd in the mould.

In this example the mould 22 is shown enclosed in a jacket 25 the drain pipe 26 of which is connected to a trap 27 which in turn is connected to a pump to set up a partial vacuum in the jacket 25 and thereby assist exudation of whey.

Another jacket 28 is shown surrounding the tubular duct 23 for the purpose of heating the curd. Heating medium can be circulated through the jacket 28 by pipes 29 and 30.

The invention is not limited to a mould of square or rectangular cross section for instance one of circular cross section may be constructed as indicated in Figures 14 to 16. In this example a mould is composed of numerous metal rings 31 each of which may be composed of segments or be a complete ring, the end rings 32 being flanged so that they can be connected by bolts 33 to clamp all the rings firmly edge to edge.

We claim:

1. A mold of rectangular cross section for use in compressing cheese curd to expel residual whey comprising an assembly of metal laths having adjacent plane edges in direct contact and flush smooth inner surface, said laths together forming a complete peripheral surface for the mold, rectangular frames embracing said assembly of laths, each frame including four bars overlapping at their adjacent ends, said bars having bolt holes in their overlapping ends, connecting bolts passing through said adjacent ends, spacing sleeves on said bolts, the bolt holes in the alternate ends of the bars being larger than the bolts, and the spacing sleeves adjacent said larger holes having eccentrics engaging therein for contracting said frames and thereby forcing said assembly of laths together with their adjacent plane edges in pressure contact for permitting exudation of whey but preventing extrusion of curd between them.

2. A mold for use in compressing cheese curd and exuding residual whey therefrom as specified in claim 1 having an inlet at one end and a restricted outlet at the other, and means including a hopper and a reciprocatory plunger for charging said mold with cheese curd.

References Cited in the file of this patent

UNITED STATES PATENTS

| | | |
|---|---|---|
| 32,820 | Codding | July 16, 1861 |
| 134,910 | Martin | Jan. 14, 1873 |
| 315,529 | McGowan | Apr. 14, 1885 |
| 594,013 | Holthaus | Nov. 23, 1897 |
| 731,736 | Anderson | June 23, 1903 |
| 1,974,697 | Njzn | Sept. 25, 1934 |
| 2,272,954 | Sartori | Feb. 10, 1942 |
| 2,369,192 | Upton | Feb. 13, 1945 |
| 2,676,882 | Hatch | Apr. 27, 1954 |

FOREIGN PATENTS

| | | |
|---|---|---|
| 61,774 | Norway | Dec. 11, 1939 |

UNITED STATES PATENT OFFICE
CERTIFICATE OF CORRECTION

Patent No. 2,845,857                      August 5, 1958

George M. Robertson et al.

It is hereby certified that error appears in the above numbered patent requiring correction and that the said Letters Patent should read as corrected below.

In the grant, line 3, and in the heading to the printed specification, line 4, address of the inventors, for "Gildford, England" read -- Guildford, England --.

Signed and sealed this 1st day of September 1959.

(SEAL)
Attest:

KARL H. AXLINE
Attesting Officer

ROBERT C. WATSON
Commissioner of Patents